United States Patent [19]

Komiya

[11] Patent Number: 4,692,856

[45] Date of Patent: Sep. 8, 1987

[54] POSITION CONTROL OF MULTIPLE TOOLS BASED ON ELAPSED TIME OF TOOL OPERATION

[75] Inventor: Hidetsugu Komiya, Tokyo, Japan

[73] Assignee: Fanuc Ltd., Yamanashi, Japan

[21] Appl. No.: 681,867

[22] PCT Filed: Mar. 27, 1984

[86] PCT No.: PCT/JP84/00134

§ 371 Date: Nov. 28, 1984

§ 102(e) Date: Nov. 28, 1984

[87] PCT Pub. No.: WO84/03956

PCT Pub. Date: Oct. 11, 1984

[30] Foreign Application Priority Data

Mar. 28, 1983 [JP] Japan ................... 58-52016

[51] Int. Cl.$^4$ .................... G05B 19/18; G05B 23/02
[52] U.S. Cl. .................... 364/167; 364/143; 364/174; 364/175; 364/474; 318/565; 318/567; 318/569; 318/601; 377/16; 377/20; 82/2 B
[58] Field of Search .................... 364/143–145, 364/167, 169, 174, 175, 474; 377/16, 20; 318/561, 563, 565, 567, 569, 601; 82/2 B

[56] References Cited

U.S. PATENT DOCUMENTS

| | | | |
|---|---|---|---|
| 4,104,726 | 8/1978 | Fisk et al. | 364/143 |
| 4,245,298 | 1/1981 | Slater | 364/167 |
| 4,397,031 | 8/1983 | Weber | 377/20 |
| 4,423,365 | 12/1983 | Turner | 318/561 |
| 4,469,993 | 9/1984 | Swanson et al. | 318/561 |
| 4,510,426 | 4/1985 | Michaels et al. | 318/565 |
| 4,549,260 | 10/1985 | Saito et al. | 364/143 |

Primary Examiner—Michael R. Fleming
Assistant Examiner—John R. Lastova
Attorney, Agent, or Firm—Staas & Halsey

[57] ABSTRACT

A numerical control method for numerically controlling a machine tool such as a multi-spindle lathe having two or more tools ($TL_1$, $TL_2$, $TL_3$). The numerical control method has steps of creating numerical control data specifying a relation between time and a position along each axis of movement ($X_1$, $X_2$, $X_3$, $Z$), numerically controlling the position along each of the axes of movement ($X_1$, $X_2$, $X_3$, $Z$) on the basis of the numerical control data, monitoring whether elapsed time has reached a time specified by numerical control data for each and every axis of movement ($X_1$, $X_2$, $X_3$, $Z$), and when elapsed time has become equal to a time specified by numerical control data for a predetermined axis of movement, controlling the position along the axis of movement in accordance with succeeding numerical control data for the axis of movement.

6 Claims, 8 Drawing Figures

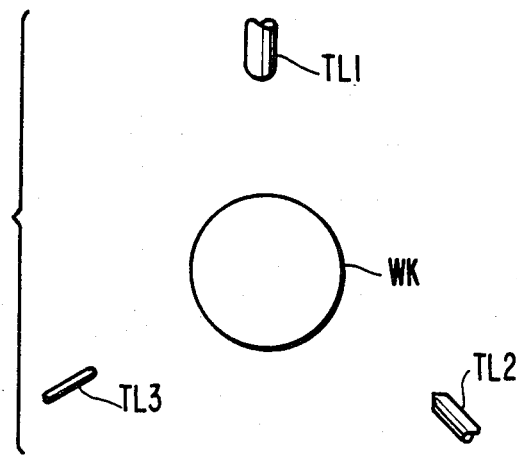
FIG. 1.
FIG. 3.
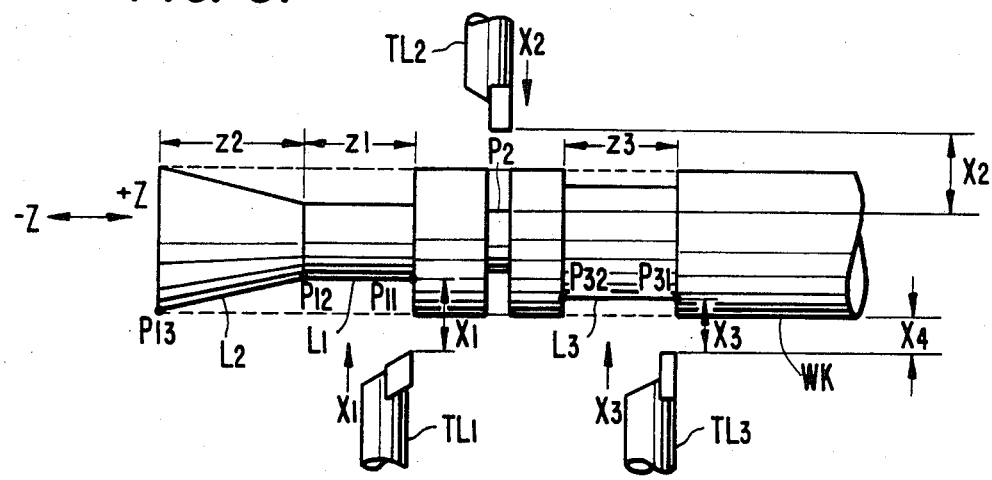
FIG. 4.
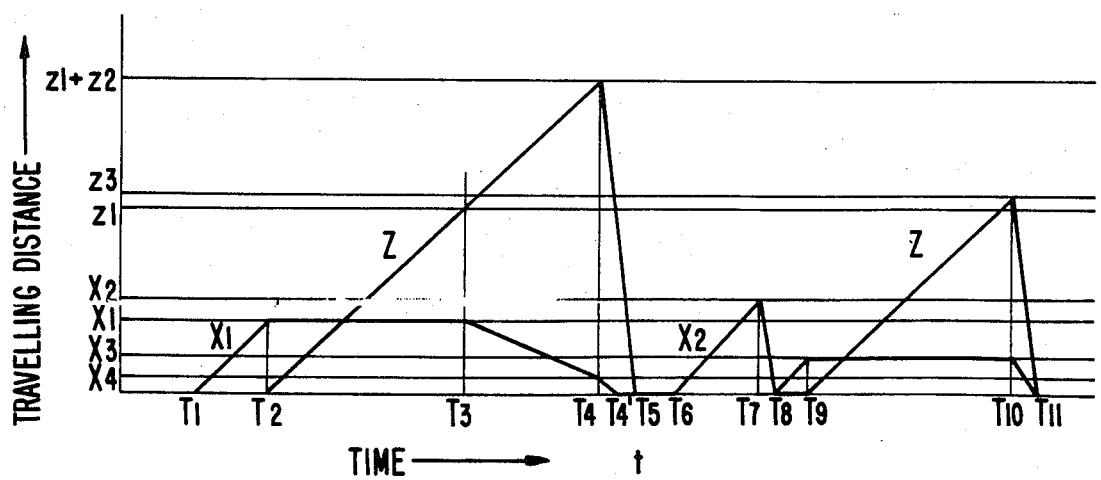

FIG. 5.
| X1 AXIS | X2 AXIS | X3 AXIS | Z AXIS |
|---|---|---|---|
| $T_1, 0$ | $T_6, 0$ | $T_8, 0$ | $T_2, 0$ |
| $T_2, X_1$ | $T_7, X_2$ | $T_9, X_3$ | $T_4, (z_1 + z_2)$ |
| $T_3, X_1$ | $T_8, 0$ | $T_{10}, X_3$ | $T_5, 0$ |
| $T_4, X_4$ | M99; | $T_{11}, 0$ | $T_9, 0$ |
| $T_4, 0$ | | M99; | $T_{10}, z_3$ |
| M99; | | | $T_{11}, 0$ |
| | | | M99; |
FIG. 6.
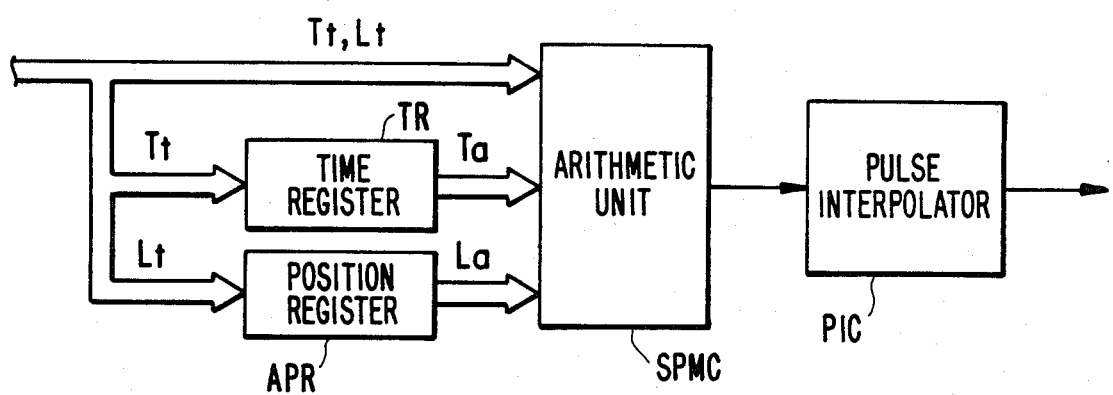
FIG. 8.
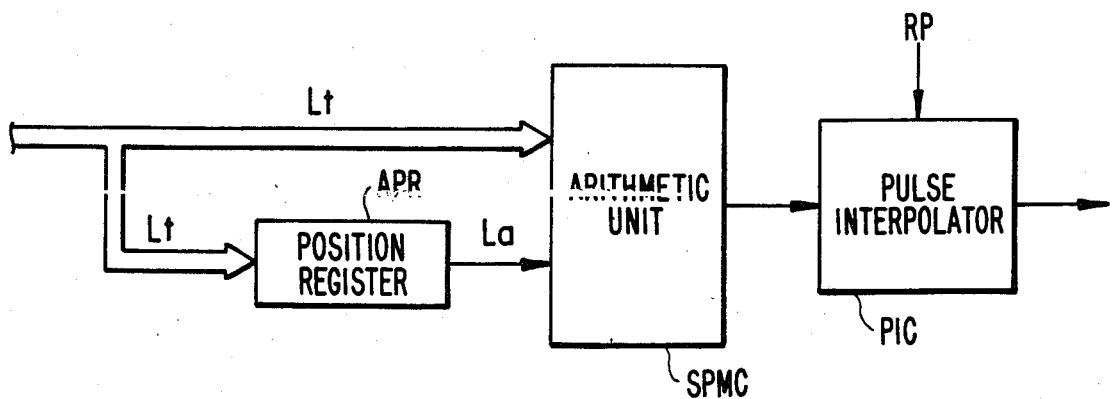

4,692,856

POSITION CONTROL OF MULTIPLE TOOLS BASED ON ELAPSED TIME OF TOOL OPERATION

BACKGROUND OF THE INVENTION

This invention relates to a numerical control method and, more particularly, to a numerical control method well-suited for application to a machine tool such as multi-spindle automatic lathe.

As shown in FIG. 1, a multi-spindle automatic lathe, which is for the purpose of shortening machining time and fostering mass production, has a number of mutually independently movable shafts (tools) $TL_1$ through $TL_3$ arrayed about a workpiece WK. The arrangement is such that the lathe subjects the workpiece WK to prescribed machining by applying machining performed by one tool followed by machining performed by a subsequent one of the tools when the preceeding machining is completed. However, in order to make it possible to control the movement of each tool independently in such a multi-spindle automatic lathe, a cam rotated by a rotary shaft, not shown, is provided for each and every tool, and it is arranged so that the workpiece is subjected to prescribed machining by moving the tools toward the workpiece independently due to rotation of the cams. This results in structural complexity and higher cost. Furthermore, though multi-spindle automatic lathes may be controlled numerically, the creation of NC data is troublesome.

SUMMARY OF THE INVENTION

An object of the present invention is to provide a novel numerical control method in which such cams are unnecessary, and through which NC data can be created in a simple manner and numerical control performed on the basis of such NC data.

Another object of the present invention is to provide an effective numerical control method for use in controlling a multi-spindle automatic lathe.

A further object of the present invention is to provide a numerical control method whereby there is created NC data which indicates the correspondence between time and position for every axis of movement, or NC data which indicates the correspondence between a rotational angle of a predetermined rotary shaft and position for every axis of movement. Formation in accordance with information, whenever elapsed time or the rotational angle of the rotary shaft becomes equal to a time or rotational angle specified by NC data in a currently prevailing block, a position along a predetermined axis of movement is controlled in accordance with NC data in a succeeding block.

The present invention provides a numerical control method which includes creating, for every axis of movement, a relation between time and a position along the axis of movement or a relation between a rotational angle and a position along the axis of movement, the relation serving as numerical control data; controlling each axis of movement based on the numerical control data; monitoring elapsed time or the rotational angle; and, whenever the elapsed time or rotational angle attains a time or rotational angular position specified by the numerical control data for each axis of movement, controlling the axis of movement in accordance with succeeding numerical control data. According to this numerical control method, NC data can be created in simple fashion so that the method is well-suited for use in controlling a multi-spindle automatic lathe or the like.

BRIEF DESCRIPTION OF THE DRAWINGS

FIG. 1 schematically illustrates a multi-spindle lathe;

FIG. 3 is a illustrates a machined shape according to the present invention;

FIG. 4 illustrates curves showing the relation between position and time for each axis of movement for the purpose of obtaining the machined shape shown in FIG. 3;

FIG. 5 illustrates the NC data used to obtain the machined shape shown in FIG. 3;

FIG. 6 is a block diagram of a pulse distributor circuit in FIG. 2;

FIG. 8 is a block diagram of a pulse distributor circuit in FIG. 7.

DESCRIPTION OF THE PREFERRED EMBODIMENTS

Figure 2:
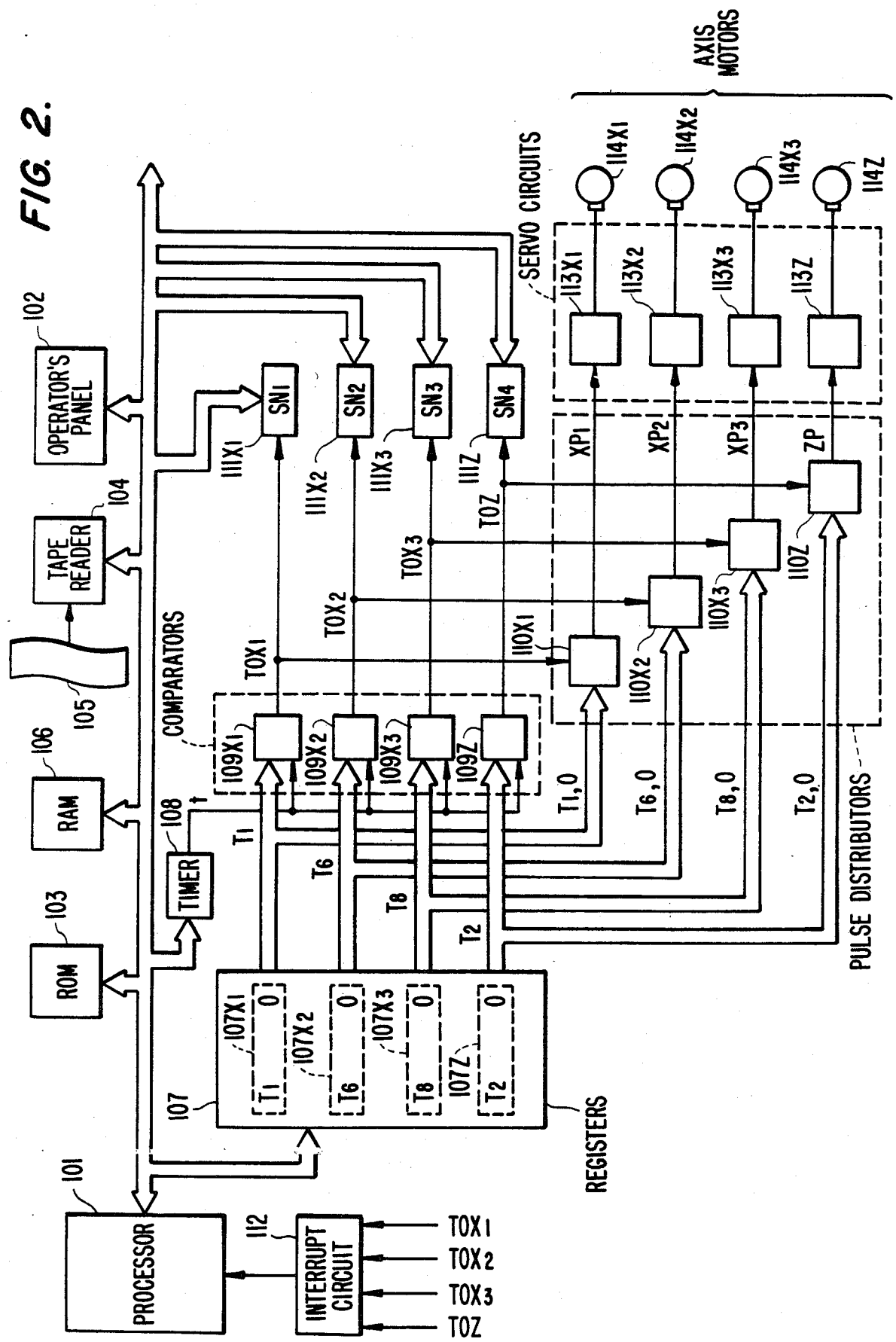
FIG. 2 is a block diagram of an NC apparatus to which the present invention is applied.

FIG. 2 is a block diagram of a first embodiment of the present invention. Hereafter a case will be described wherein a part having the shape shown in FIG. 3 is machined by a multi-spindle automatic lathe which includes three tools $TL_1$, $TL_2$, $TL_3$. In the description it will be assumed that $X_1$, $X_2$ and $X_3$ respective are the axes along which the first, second and third tools $TL_1$, $TL_2$, $TL_3$ move, and that the Z axis is the axis along which the workpiece moves with respect to the tools in a longitudinal direction.

An NC data read operation is initiated by an operator's panel 102. This causes a processor 101, under the control of a control program stored in a ROM 103, to deliver an NC data read command to a data reader 104. This command causes the reader to read numerical control data (NC data) punched in a paper tape 105. The read NC data is stored in a RAM 106.

If we assume that the part having the shape shown in FIG. 3 is to be machined, then a relation (time chart) between position and time for each of the axes of movement will be as illustrated in FIG. 4. The NC data created in accordance with the time chart are stored (punched) on the paper tape 105. More specifically, the NC data is created in the following form and punched into the paper tape 105:

$X_1$ $T_1$, 0; $T_2$, $x_1$; $T_3$, $x_1$; $T_4$, $x_4$; $T_4'$, 0; M99;
$X_2$ $T_6$, 0; $T_7$, $x_2$; $T_8$, 0; M99;
$X_3$ $T_8$, 0; $T_9$, $x_3$; $T_{10}$, $x_3$; $T_{11}$, 0; M99;
Z $T_2$, 0; $T_4$, $(z_1+z_2)$; $T_5$, 0; $T_9$, 0; $T_{10}$, $z_3$;
$T_{11}$, 0; M99;

where M99 signifies the end of the command for each axis. Accordingly, after reading the NC data, this data will be stored for each axis in the RAM 106 in order of time as shown in FIG. 5.

When an NC control start signal is issued by the operator's panel 102 after the NC data is stored in the RAM 106, the processor 101 reads a first item of NC data for each axis out of the RAM 106, that is, reads $T_1$, 0; with regard to the $X_1$ axis, $T_6$, 0; with regard to the $X_2$ axis, $T_8$, 0; with regard to the $X_3$ axis, and $T_2$, 0; with regard to the Z axis, stores these data in respective registers $107X_1$, $107X_2$, $107X_3$ and $107Z$ of a register section 107, and initiates the timing operation of a timer 108. Of the first items of NC data for these axes, times $T_1$, $T_6$, $T_8$, $T_2$ are applied to respective comparators $109X_1$, $109X_2$, $109X_3$ and $109Z$. Further, the first items of NC data $T_1$, 0; $T_6$, 0; $T_8$, 0; $T_2$, 0; are applied to respective pulse distributor circuits $110X_1$, $110X_2$, $110X_3$, $110Z$. As shown in FIG. 6, the pulse distributor circuits $110X_1$, $110X_2$, $110X_3$, $110Z$ each have a position register APR (initial value zero), a time register TR (initial value zero), an arithmetic unit SPMC, and a well-known pulse interpolator PIC. Let us assume that a position commanded by the NC data is $L_t$, that a commanded position in a preceding block stored in the position register APR is $L_a$, that a time commanded by the NC data is $T_t$, and that a commanded time in the preceding block stored in the time register TR is $T_a$. The arithmetic unit SPMC calculates an incremental value $L_i$ and a feedrate $F_i$ based on the following equations:

$$L_i = L_t - L_a \quad (1)$$

$$F_i = |L_t - L_a|/(T_t - T_a) \quad (2)$$

and delivers these to the pulse interpolator PIC. The latter performs a well-known pulse interpolation operation based on $L_i$ and $F_i$ to produce distributed pulses having a frequency proportional to $F_i$. It should be noted that the content of the position register APR and of the time register TR is replaced by $L_t$, $T_t$, respectively, after the operations of Eqs. (1), (2) are performed.

When the first items of NC data are applied to the pulse distributor circuits $110X_1$, $110X_2$, $110X_3$, $110Z$, Eqs. (1), (2) are evaluated. Since the results of the computations will be zero, however, no distributed pulses are produced.

Meanwhile, the comparators $109X_1$, $109X_2$, $109X_3$, $109Z$ constantly determine whether a present time t has become equal to times $T_1$, $T_6$, $T_8$, $T_2$ applied thereto from the register section 107. The comparator $109X_1$ produces a time-over signal $TOX_1$ if $t=T_1$ holds, the comparator $109Z$ a time-over signal $TOZ$ if $t=T_2$ holds, the comparator $109X_2$ a time-over signal $TOX_2$ if $t=T_6$ holds, and the comparator $109X_3$ a time-over signal $TOX_3$ if $t=T_8$ holds. When the time-over signals $TOX_1$, $TOX_2$, $TOX_3$, $TOZ$ are generated, the corresponding pulse distributor circuits $110X_1$, $110X_2$, $110X_3$, $110Z$ immediately cease their pulse distribution operations and corresponding counters $111X_1$, $111X_2$, $111X_3$, $111Z$ have their states (initial value 1) $SN_1$, $SN_2$, $SN_3$, $SN_4$ incremented by one in accordance with the following expressions:

$$SN_1+1 \rightarrow SN_1, \; SN_2+1 \rightarrow SN_2,$$

$$SN_3+1 \rightarrow SN_3, \; SN_4+1 \rightarrow SN_4$$

The time-over signals $TOX_1$, $TOX_2$, $TOX_3$, $TOZ$ enter an interrupt circuit 112 to interrupt the processor 101 immediately. When this occurs, the processor 101 reads the state of the counters ($111X_1$, $111X_2$, $111X_3$, $111Z$) associated with the axes of movement for which the time-over signals have been generated, accesses RAM 106 to read the NC data designated by these counters; and delivers the NC data to the register section 107. This NC data is delivered to the comparators and pulse distributor circuits of the corresponding axes.

If we take FIGS. 3 and 4 as an example, the time-over signal $TOX_1$ is generated and the state $SN_1$ of counter $111X_1$ is incremented to 2 when $t=T_1$ holds. As a result, the processor 101 goes to the RAM 106 to read out NC data (a second item of NC data) $T_2$, $x_1$; concerning the $X_1$ axis, which data is designated by the state $SN_1$ of the counter. The processor sets this data in the register $107X_1$. The commanded time $T_2$ and the commanded position $x_1$ enter the pulse distributor circuit $110X1$. The commanded time $T_2$ is also applied to the comparator $109X_1$, in response to which the comparator $109X_1$ restarts the time comparison operation. Meanwhile, the pulse distributor circuit $110X_1$ executes the evaluation of Eqs. (1), (2) to obtain the incremental value $L_i$ and feedrate $F_i$, and executes a pulse distribution operation based on $L_i$, $F_i$ to generate distributed pulses $XP_1$. It should be noted that $L_i=x_1$, $F_i=x_1/(T_2-T_1)$ since $L_t=x_1$, $L_a=0$, $T_t=T_2$, $T_a=T_1$ in Eqs. (1), (2).

The distributed pulses $XP_1$ produced by the pulse distributor circuit $110X_1$ enter a servo circuit $113X_1$. An $X_1$-axis motor $114X_1$ rotates under the control of the servo circuit $113X_1$ so that the tool $TL_1$ (FIG. 3) starts to move (refer to segment $X_1$ in FIG. 4). By continuing the foregoing control operation, the tool $TL_1$ reaches a point $P_{11}$ in FIG. 3 at a time $t=T_2$.

When the relation $t=T_2$ is attained, the comparators $109X_1$, $109Z$ generate the time-over signals $TOX_1$, $TOZ$, in response to which the pulse distributor circuit $110X_1$ immediately halts the pulse distribution operation. Moreover, the states $SN_1$, $SN_4$ of counters $111X_1$, $111Z$ attain values of 3 and 2, respectively, and the processor 101 is interrupted. Upon being interrupted as described, the processor 101 reads the contents of counters $111X_1$, $111Z$ and, using the states $SN_1$, $SN_4$, access RAM 106 to read a third item of NC data $T_3$, $x_1$; with regard to the $X_1$ axis and a second item of NC data $T_4$, $(z_1+z_2)$; with regard to the Z axis, this NC data then being set in the registers $107X_1$, $107Z$, respectively. Of the NC data $T_3$, $x_1$ for the $X_1$ axis, the commanded time $T_3$ is applied to the comparator $109X_1$ and pulse distributor circuit $110X_1$, and the commanded position $x_1$ is applied to the pulse distributor circuit $110X_1$. Of the NC data $T_4$, $(z_1+z_2)$ for the Z axis, the commanded time $T_4$ is applied to the comparator $109Z$ and pulse distributor circuit $110Z$, and the commanded position $(z_1+z_2)$ is applied to the pulse distributor circuit $110Z$. Thereafter, the comparators $109X_1$, $109Z$ resume the time comparison operations. Meanwhile, the pulse distributor circuits $110X_1$, $110Z$ evaluate the Eqs. (1), (2) to obtain the incremental value $L_i$ and the feedrate $F_i$ and execute pulse distribution operations based on these values. With regard to the $X_1$ axis, $L_i=0$, $F_i=0$ will hold. As a result, no distributed pulses are generated and movement stops along the $X_1$ axis. Further, since $L_i=(z_1+z_2)$, $F_i=(z_1+z_2)/(T_4-T_2)$ will hold for the Z axis, distributed pulses ZP are generated and enter a servo circuit $113Z$. As a result, a Z-axis motor $114Z$ rotates so that the workpiece WK (FIG. 3) starts to be moved along the $+Z$ axis (refer to segment Z in FIG. 1). The tool $TL_1$ consequently travels relative to the workpiece WK, i.e., along a straight line segment $L_1$ (FIG. 3) to perform cutting. By continuing the foregoing control operation, the tool $TL_1$ moves relative to the workpiece and arrives at a point $P_{12}$ in FIG. 3 at the instant $t=T_3$ is attained.

Meanwhile, when $t=T_3$ is attained, the comparator $X_1$ generates the time-over signal $TOX_1$ to increment the state $SN_1$ of counter $111X_1$ to 4 and interrupt the processor 101. Upon being interrupted, the processor 101 reads the state $SN_1$ (=4) of counters $111X_1$, accesses RAM 106 to read a fourth item of NC data $T_4$, $x_4$;, and sets the data in the register $107X_1$. Of the NC data set in the register $107X_1$, the commanded time $T_4$ is applied to the comparator $109X_1$ and pulse distributor circuit $110X_1$, and the commanded position $x_4$ is applied to the pulse distributor circuit $110X_1$. Thereafter, the comparator $109X_1$ resumes the time comparison operation, and the pulse distributor $110X_1$ evaluates the Eqs. (1), (2) to obtain the incremental value $L_i$ and the feedrate $F_i$ and executes pulse distribution operations based on these values. It should be noted that at this time the following holds: $L_i=(x_4-x_1)$, $F_i=(x_1-x_4)/(T_4-T_3)$.

As a result, simultaneous two-axis control is exercised along the $X_1$ and Z axes so that the tool $TL_1$ is moved along a line segment $L_2$ (FIG. 3) to perform taper cutting. By continuing taper machining, the tool $TL_1$ will reach a point $P_{13}$ at the instant $t=T_4$ is attained.

When the relation $t=T_4$ is attained, the comparators $109X_1$, $109Z$ generate the time-over signals $TOX_1$, TOZ, in response to which the pulse distributor circuits $110X_1$, $110Z$ immediately halt their pulse distribution operations. Moreover, the states $SN_1$, $SN_4$ of counters $111X_1$, $111Z$ attain values of 5 and 3, respectively, and the processor 101 is interrupted. Upon being interrupted, the processor 101 reads the contents of counters $111X_1$, $111Z$ and, using the states $SN_1$, $SN_4$, accesses RAM 106 to read a fifth item of NC data $T_4'$, 0 with regard to the $X_1$ axis and a third item of NC data $T_5$, 0 with regard to the Z axis. This data being set in the registers $107X_1$ and $107Z$, respectively. After this has been accomplished, this data is applied to the comparators $109X_1$, $109Z$ and to the pulse distributor circuits $110X_1$, $110Z$. Thereafter, control similar to the foregoing is carried out to return the tool $TL_1$ to its initial position at time $T_4'$ and to return the workpiece WK to its initial position at time $T_5$, so that the relation between the workpiece and each of the tools will be as shown in FIG. 3. When the relation $t=T_5$ is attained, the state $SN_4$ of the counter $111Z$ takes on a numerical value of 4 and a fourth item of NC data $T_9$, 0 relating to the Z axis is set in the register $107Z$. Since $L_i=0$ will hold, however, there is no movement of the workpiece WK along the Z axis so that the workpiece is at rest until $t=T_9$ is achieved. Further, when the relation $t=T_4'$ is attained, the state $SN_1$ of the counter $111X_1$ takes on a numerical value of 6, so that the processor 101 reads a sixth item of NC data concerning the $X_1$ axis out of the RAM 106. Since the sixth item of NC data is M99;, however, the processor 101 identifies this as indicating the end of control along the $X_1$ axis.

Thereafter, the comparator $X_2$ generates the time-over signal $TOX_2$ when the relation $t=T_6$ is attained. As a result, the state $SN_2$ of the counter $X_2$ takes on a numerical value of 2, so that the processor 101 reads a second item of NC data $T_7$, $x_2$ concerning the $X_2$ axis out of the RAM 106 and sets the data in the register $107X_2$. The commanded time $T_7$ and the commanded position $x_2$ enter the pulse distributor circuit $110X_2$. The commanded time $T_7$ is also applied to the comparator $109X_2$, in response to which the comparator $109X_2$ restarts the time comparison operation. Meanwhile, the pulse distributor circuit $110X_2$ executes the evaluation of Eqs. (1), (2) to obtain the incremental value $L_i$ and feedrate $F_i$, and executes a pulse distribution operation based on $L_i$, $F_i$ to generate distributed pulses $XP_2$. It should be noted that at this time the following holds: $L_i=x_2$, $F_i=x_2/(T_7-T_6)$.

The distributed pulses $XP_2$ produced by the pulse distributor circuit $110X_2$ enter a servo circuit $113X_2$. An $X_2$-axis motor $114X_2$ rotates under the control of the servo circuit $113X_2$ so that the tool $TL_2$ (FIG. 3) starts to move (refer to segment $X_2$ in FIG. 4). The tool $TL_2$ reaches a point $P_2$ in FIG. 3 at a time $t=T_7$.

Thereafter, control similar to the foregoing is carried out to return the tool $TL_2$ to its initial position at $t=T_8$. At the same time that the tool $TL_2$ is returned to its initial position, the tool $TL_3$ starts travelling (see segment $X_3$ in FIG. 3) and stops upon arriving at a point $P_{31}$ (FIG. 3) at time $T_9$. When time $T_9$ is reached, the workpiece WK travels a distance $z_3$ along the $+Z$ axis until time $t_{10}$. In other words, the tool $TL_3$ travels relative to the workpiece WK along a straight line $L_3$ to perform cutting. The tool $TL_3$ and workpiece Wk subsequently return to their initial positions and control for machining the part having the shape shown in FIG. 3 ends.

Figure 7:
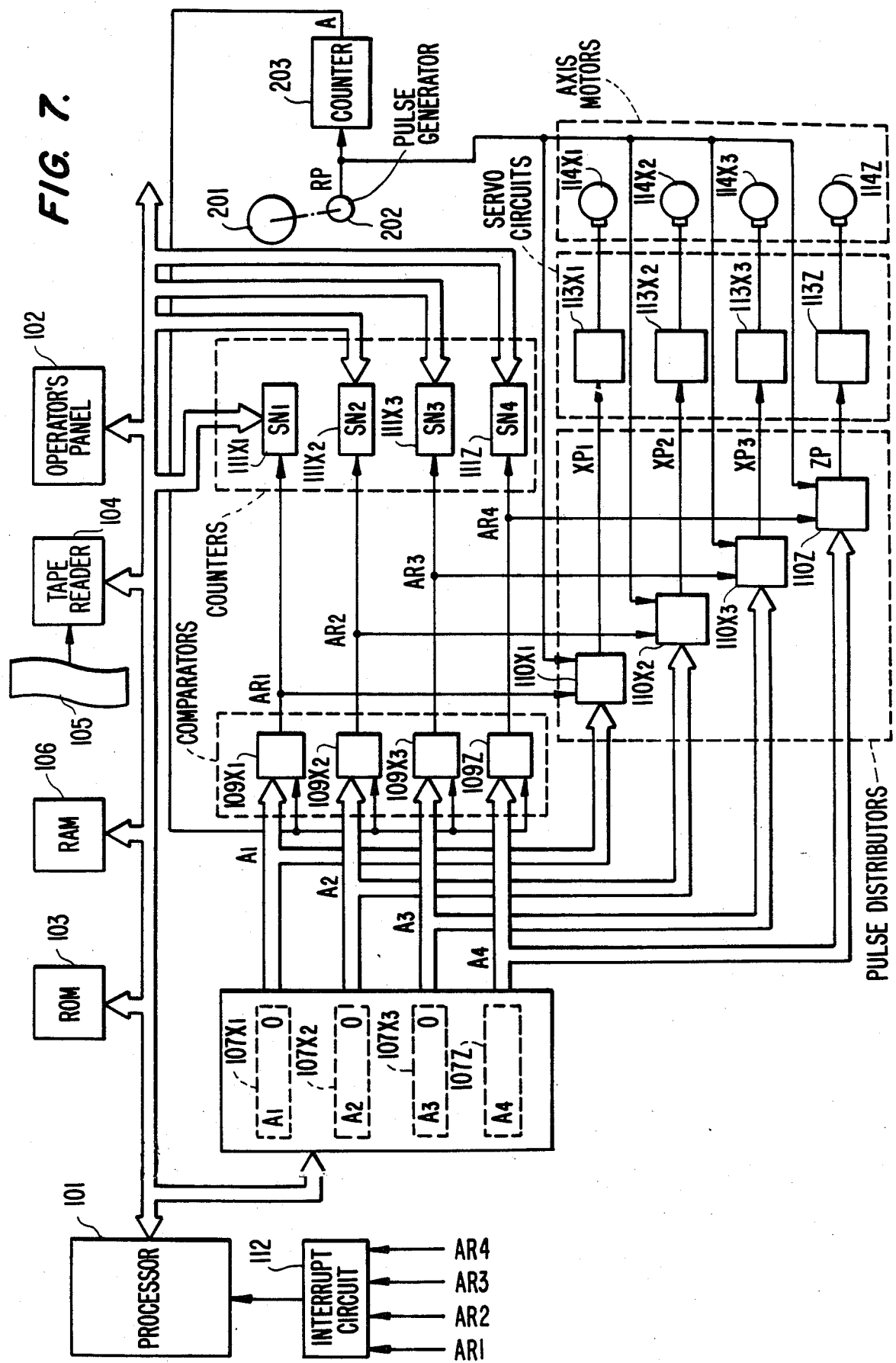
FIG. 7 is another block diagram of an NC apparatus to which the present invention is applied.

According to the foregoing description, the arrangement is such that a subsequent item of NC data is read out of the RAM 106 whenever a time-over signal is generated. However, an arrangement is permissible wherein two blocks of NC data are read at all times by means of a prereading technique. It is also possible to provide the NC data with an M-function instruction or the like. Furthermore, while the NC data have been created so as to specify a relation between time and position, it is also possible to create NC data so as to specify a relation between a rotational angle and position by using a Q-l table in which a rotational angle Q is taken as a horizontal axis and position l is taken as a vertical axis. FIG. 7 is a block diagram of an embodiment for a case where NC data are created by using a Q-l table. FIG. 8 is an example of a pulse distributor circuit in such case.

FIG. 7 differs from FIG. 2 in that (1) the timer 108 of FIG. 2 is supplanted by a pulse generator 202 for generating one rotation pulse RP each time a motor 201 driving a rotary shaft rotates through a predetermined angle, and by a counter 203 for monitoring the rotational angle by counting the rotation pulses RP generated by the pulse generator 202, (2) a value (rotational angle) A counted by the counter 203 is applied as an input to each of the comparator circuits $109X_1$, $109X_2$, $109X_3$, $109Z$ and (3) the rotation pulses RP are applied as inputs to the pulse distributor circuits $110X_1$, $110X_2$, $110X_3$, $110Z$.

The comparators $109X_1$, $109X_2$, $109X_3$, $109Z$ compare rotational angles $A_1$, $A_2$, $A_3$, $A_4$ specified by NC data with the actual rotational angle A produced by the counter 203. When agreement is attained, the comparators produce respective arrival signals $AR_1$, $AR_2$, $AR_3$, $AR_4$ instead of the time-over signals $TOX_1$, $TOX_2$, $TOX_3$, $TOX_4$ of FIG. 2. The arithmetic unit SPMC (FIG. 8) of each of the pulse distributor circuits $110X_1$, $110X_2$, $110X_3$, $110Z$ calculates the incremental value $L_i$, which is the difference between the position $L_t$ commanded by the NC data and the commanded position $L_a$ of the preceding block stored in the position register APR, and delivers the incremental value to the pulse interpolator PIC. The latter produces distributed pulses by executing a well-known pulse interpolation calculation based on the incremental value $L_i$ whenever the rotation pulse RP is generated.

According to the present invention, the arrangement is such that correspondence between time and position, or between rotational angle and position, is created for each controlled axis. NC data can therefore be created in a simple manner from a time chart or a Q-l table. In addition, according to the present invention, the apparatus is so constructed as to enable NC control on a time or rotational angle basis so that numerical control can be performed by using the aforementioned NC data. The invention is therefore extremely effective when applied to a multi-spindle automatic lathe.

I claim:

1. A numerical control method for numerically controlling a machine tool having two or more tools, each tool having an axis of movement with respect to a workpiece, comprising the steps of:
   (a) creating a time chart representing a relationship between time and position of one of said tools along its associated axis of movement;
   (b) creating numerical control data specifying said relationship between time and position of one of said tools along its associated axis of movement;
   (c) numerically controlling the position of said tools along each of the axes of movement on the basis of a portion of said numerical control data;
   (d) monitoring elapsed time of said numerically controlled positioning;
   (e) monitoring whether said elapsed time corresponds to a time specified by said first portion of said numerical control data for each tool and its associated axis of movement;
   (f) determining when said elapsed time equals a time specified by said first portion of said numerical control data; and
   (g) numerically controlling the position of one of said tools along its axis of movement in accordance with a succeeding position of said numerical control data for said axis of movement.

2. A numerical control method according to claim 1, further including the steps of:
   calculating a velocity from said time data and said position data; and
   generating pulses having a frequency proportional to said velocity by a pulse interpolation calculation, and wherein steps (b) and (f) include numerically controlling the position of a tool along an axis of movement in accordance with said pulses.

3. A numerical control method according to claim 1, wherein steps (b) and (f) include numerically controlling said two or more tools along axes of movement which are directed toward the center of the workpiece and along an axis directed longitudinally of the workpiece.

4. A numerical control method for numerically controlling a machine tool having two or more tools, each having a axis of movement with respect to a workpiece, comprising the steps of:
   (a) creating a rotational angle-position table for representing a relationship between a rotational angle of a predetermined rotary shaft and a position of one of said tools along its associated axis of movement;
   (b) creating numerical control data specifying said relationship between a rotational angle of a predetermined rotary shaft and a position of one of said tools along its associated axis of movement;
   (c) numerically controlling the position of said tools along their respective axes of movement on the basis of a portion of said numerical control data;
   (d) monitoring elapsed time of said numerically controlled positioning;
   (e) sensing the rotational angle of the rotary shaft;
   (f) monitoring whether the sensed rotational angle of said rotary shaft corresponds to a rotational angle specified by said first portion of said numerical control data for each tool and its axis of movement;
   (g) determining when the sensed rotational angle of the rotary shaft equals a rotational angle specified by said first portion of numerical control data; and
   (h) numerically controlling the position of one of said tools along its axis of movement in accordance with a succeeding portion of said numerical control data for said axis of movement.

5. A numerical control method according to claim 4, further comprising the steps of:
   generating a pulse whenever said predetermined rotary shaft rotates through a predetermined angle; and
   executing a pulse interpolation calculation using said position data whenever said pulse is generated, and wherein steps (b) and (g) include numerically controlling the position of a tool along an axis of movement in accordance with pulses provided by said pulse interpolation calculation.

6. A numerical control method according to claim 4, wherein steps (b) and (g) include numerically controlling said two or more tools along axes of movement which are directed toward the center of a workpiece and along an axis directed longitudinally of the workpiece.

* * * * *

UNITED STATES PATENT AND TRADEMARK OFFICE
CERTIFICATE OF CORRECTION

PATENT NO. : 4,692,856
DATED : Sept. 8, 1987
INVENTOR(S) : Komiya

It is certified that error appears in the above-identified patent and that said Letters Patent is hereby corrected as shown below:

```
Title page [73] "Yamanashi" s/b --Minamitsuru--.
  Col. 1, line 47, "Formation" s/b --For motion--.
  Col. 2, line 8, delete "is a";
          line 31, "respective are the" s/b --are the respective--.
  Col. 4, line 31, "interrupted" s/b --interrupted as described--;
          line 31, delete "as";
          line 32, delete "described".
  Col. 5, line 59, 110X2" s/b --110X₂--.

Col. 6, line 3, "114X2" s/b --114X₂--;
          line 31, "Q-1" s/b --Q-1--;
          line 33, "1" s/b --1--;
          line 35, "Q-1" s/b --Q-1--.
  Col. 7, line 2, "Q-1" s/b --Q-1--;
  Col. 8, line 5, "a" (first occurrence) s/b --an--.
```

Signed and Sealed this

Sixteenth Day of February, 1988

*Attest:*

DONALD J. QUIGG

*Attesting Officer*   *Commissioner of Patents and Trademarks*